United States Patent
Byler

(10) Patent No.: US 6,845,303 B1
(45) Date of Patent: Jan. 18, 2005

(54) MICRO-SATELLITE AND SATELLITE FORMATION FOR INVERSE AND DISTRIBUTED PROXIMITY OPERATIONS

(75) Inventor: Eric Alan Byler, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/287,683

(22) Filed: Nov. 5, 2002

(51) Int. Cl.$^7$ ............................ B64C 1/00; G06F 1/00; G06F 17/10; G05D 1/00; G05G 7/78
(52) U.S. Cl. ........................... 701/13; 701/2; 701/300; 701/302; 701/14; 701/7; 701/11; 244/161; 244/176; 244/177; 244/189; 244/3.14; 244/3.12; 244/3.15; 244/3.19
(58) Field of Search ..................... 701/2, 7, 11, 13, 701/14, 300, 302; 244/3.14, 3.12, 3.15, 3.19, 161, 176, 177, 189

(56) References Cited

U.S. PATENT DOCUMENTS

| | | |
|---|---|---|
| 4,079,904 A | 3/1978 | Groskopfs et al. |
| 4,298,178 A | 11/1981 | Hujsak |
| 5,139,218 A | 8/1992 | Bird et al. |
| 5,226,204 A * | 7/1993 | Schoenberger et al. ...... 14/71.5 |
| 5,379,966 A * | 1/1995 | Simeone et al. ............ 244/3.11 |
| 5,421,540 A | 6/1995 | Ting |
| 5,706,195 A * | 1/1998 | Corby et al. .................... 701/2 |
| 5,806,802 A * | 9/1998 | Scott .......................... 244/161 |
| 5,917,442 A * | 6/1999 | Manoogian .................... 342/62 |
| 5,979,830 A * | 11/1999 | Kellermeier ............ 244/158 R |
| 6,045,094 A | 4/2000 | Rivera |
| 6,072,433 A * | 6/2000 | Young et al. ................ 342/386 |
| 6,364,252 B1 | 4/2002 | Anderman |
| 6,496,755 B2 * | 12/2002 | Wallach et al. ............. 700/245 |
| 2003/0036826 A1 * | 2/2003 | Turner et al. ................... 701/3 |

FOREIGN PATENT DOCUMENTS

| | | | | |
|---|---|---|---|---|
| JP | 04342700 A | * | 11/1992 | ............ B64G/1/64 |

* cited by examiner

Primary Examiner—Thomas G. Black
Assistant Examiner—Brian J Broadhead
(74) Attorney, Agent, or Firm—McDermott Will & Emery LLP

(57) ABSTRACT

A method and apparatus for conducting proximity operations is disclosed. The method called inverser proximity operations includes maneuvering an active vehicle into general proximity to a target vehicle, transmitting from the target vehicle to the active vehicle data representing relative position and velocity between the target vehicle and the active vehicle, and maneuvering the active vehicle in accordance with the data to effect a desired proximity operation. Another method called distributed proximity operations includes maneuvering a carrier vehicle into general proximity to a target vehicle, releasing one or more active vehicles from the carrier vehicle, transmitting from the carrier vehicle to the active vehicle(s) data representing relative position and velocity between the target vehicle and the active vehicle, and maneuvering the active vehicle(s) in accordance with the data to effect a desired proximity operation. The proximity operations are similarly suitable for aeronautical systems, such as when using an active aircraft to re-fuel a target aircraft, such as a drone. Whether for space, air, or other environments, the proximity operations described can be used for re-fueling, repairing, and replacing components and/or systems.

26 Claims, 3 Drawing Sheets

MICRO-SATELLITE AND SATELLITE FORMATION FOR INVERSE AND DISTRIBUTED PROXIMITY OPERATIONS

BACKGROUND OF THE INVENTION

1. Field of the Invention

The present invention relates generally to remote control maneuvering of vehicles, and more specifically, to proximity operations between a relatively large target vehicle and a relatively smaller service vehicle. The service vehicle can have a multitude of specific missions, such as re-fueling the target vehicle, providing replacement components to the target vehicle, providing course corrections or other steering functions for the target vehicle, and even simple inspection.

2. Description of the Related Art

In a variety of fields, vehicles capable of sophisticated functionality and/or operating in hostile or remote environments tend to be costly to build and place in use. In no other field is this more dramatic than space vehicles, such as satellites, which can cost hundreds of millions of dollars. Satellites costing hundreds of millions of dollars to produce can also cost hundreds of millions of dollars to launch. Launch costs are directly related to the size or weight of the payload.

Occasionally a satellite can become either completely or partially inoperable due to system wide or component-specific failures. Even in the absence of an unexpected failure, satellites are considered to have finite, and relatively short, lives due to the limited supply of fuel for operating thrusters (which are required to maintain a desired orbit and attitude), and the limited life span of moving parts or heat-generating parts, such as momentum wheels that are used for attitude control. Batteries and solar cells are also known to have only so many charge/discharge cycles before they too become either inoperable or of diminished capacity.

In the past, it has been known to employ human resources, i.e., astronauts, on manned space missions, to dock with a troubled satellite to initiate a repair. Probably the most notable example of that would be the Hubble Space Telescope where an optical correction package was installed by what could be described as a conventional proximity operation.

FIG. 1 illustrates a conventional proximity operation in which a target vehicle 10 is presumed to have some need for a proximity operation. In the case of the Hubble Space Telescope, the target vehicle would be the Hubble satellite which, schematically illustrated, would include a sensor component 12. The sensor component 12 for the Hubble Space Telescope is an optical telescope that includes a plurality of optical elements.

When it became clear that a repair to the optical elements was required of the Hubble Space Telescope, NASA launched the Space Shuttle as a service vehicle 14 with the mission of repairing the sensor 12. In that case, the service vehicle 14 was manned, relatively large, and relatively expensive to launch and provision. The service vehicle 14 included an on-board sensor 16 for sensing position and velocity of the target satellite 10 for the purpose of making proximity maneuvers. The service vehicle 14 also included a processor module 18 for taking the position and velocity data of the sensor 16 and converting that data into command signals for thrusters, such as thrusters 20, 22, and 24, which can be differentially operated to provide a desired approach for docking. The service vehicle 14 also includes an attitude control system 25 which can also be used to precisely position the service satellite during docking or for precise inspection vectors.

A cooperating docking means allows the two satellites to be coupled together during the repair operation. A typical docking means could include a post 26 which is grabbed by a grappling arm 28.

Thus, the repair mission performed in the past, as demonstrated by the Hubble Space Telescope mission, entails the following operations. First, the service vehicle is launched. Following launch, the service vehicle will rendezvous with the target vehicle. During the rendezvous, the two vehicles come into proximity to each other as a result of orbital software. The orbital software takes into account the dynamics of the two orbits, meaning the orbit of the target vehicle and the orbit of the service vehicle. Orbital software allows the service vehicle to undergo a series of maneuvers to get somewhat close to the target vehicle; depending on the size of the vehicles, "close" can be anywhere from 1 to 100 kilometers, although greater or lesser distances can be foreseen.

Once rendezvous has been completed, for a manned mission, a pilot or astronaut takes manual control of the service vehicle and completes maneuvers either to perform the inspection sequence, or to bring the service vehicle into close proximity, meaning, close enough for the software and control to take over. Thus, for example, at the end of the proximity maneuvers, the two vehicles are ready to dock. Once docking has been completed, the repair is made by manual replacement of the sensor 12 on the target vehicle 10.

A number of patents describe maintenance and/or repair operations in space. For example, U.S. Pat. No. 5,421,540 to Ting describes a method and apparatus for recovering space debris, in which recovery vehicles are launched, and maneuvered to come into close proximity with a target object, which may-be a satellite or simply debris. As described therein, the sensing and maneuvering aspects of the proximity operation are carried by the repair or recovery vehicle. Such arrangements tend to require large, complicated vehicles that are relatively expensive to build and launch.

U.S. Pat. No. 4,298,178 to Hujsak describes a roving geosynchrounous orbit satellite maintenance system, in which a maintenance vehicle docks with a larger vehicle and off-loads replacement equipment. The vehicle includes a rotatable cradle containing part modules which can be rotated into position so that parts can be off-loaded.

U.S. Pat. No. 4,079,904 to Groskopfs et al. describes in greater detail some known docking structures that might be used in vehicles such as the Space Shuttle. U.S. Pat. No. 6,364,252 to Anderman describes a technique for implementing a particular rendezvous sequence or operation.

While the aforementioned proximity operations, particularly the Hubble repair mission, can be very effective at making certain repairs, they can also be so costly as to bring into question whether it might be less expensive to launch a replacement of the satellite 10, rather than make repairs to it.

SUMMARY OF THE INVENTION

The present invention provides a unique approach to proximity operations for many types of vehicles, including satellites. In one aspect of the invention, a method of conducting a proximity operation is provided, in which a service vehicle is maneuvered into general proximity to a target vehicle. Then, vehicle data is transmitted from the target vehicle to the service vehicle, wherein the vehicle data represents relative position and velocity between the target vehicle and the service vehicle. The service vehicle is then maneuvered in accordance with the data to effect a desired proximity operation. In a second aspect of the invention a method of conducting a proximity operation is provided in which the service vehicle, once in general proximity to a target vehicle, releases a secondary active vehicle. In this case the service vehicle transmits the relative position and velocity data between the target vehicle and active vehicle for the desired proximity operations.

In one embodiment, the target vehicle is a first satellite and the service vehicle is a second satellite, and the at least one control device includes at least one thruster disposed on the second satellite. Maneuvering is thus accomplished by throttling the at least one thruster in accordance with the command signals that are derived from the vehicle data. Alternatively, the target vehicle can be a first aircraft and the service vehicle a second aircraft. In such an embodiment, the at least one control device includes at least one control surface, such as a vertical stabilizer, flap, etc. Maneuvering the service vehicle is thus accomplished by moving the at least one control surface in accordance with the command signals that are derived from the vehicle data.

The features and advantages of the invention will become more apparent from the following detailed description when taken in conjunction with the illustrative embodiments in the accompanying drawings.

DETAILED DESCRIPTION OF THE PREFERRED EMBODIMENTS

Figure 1:
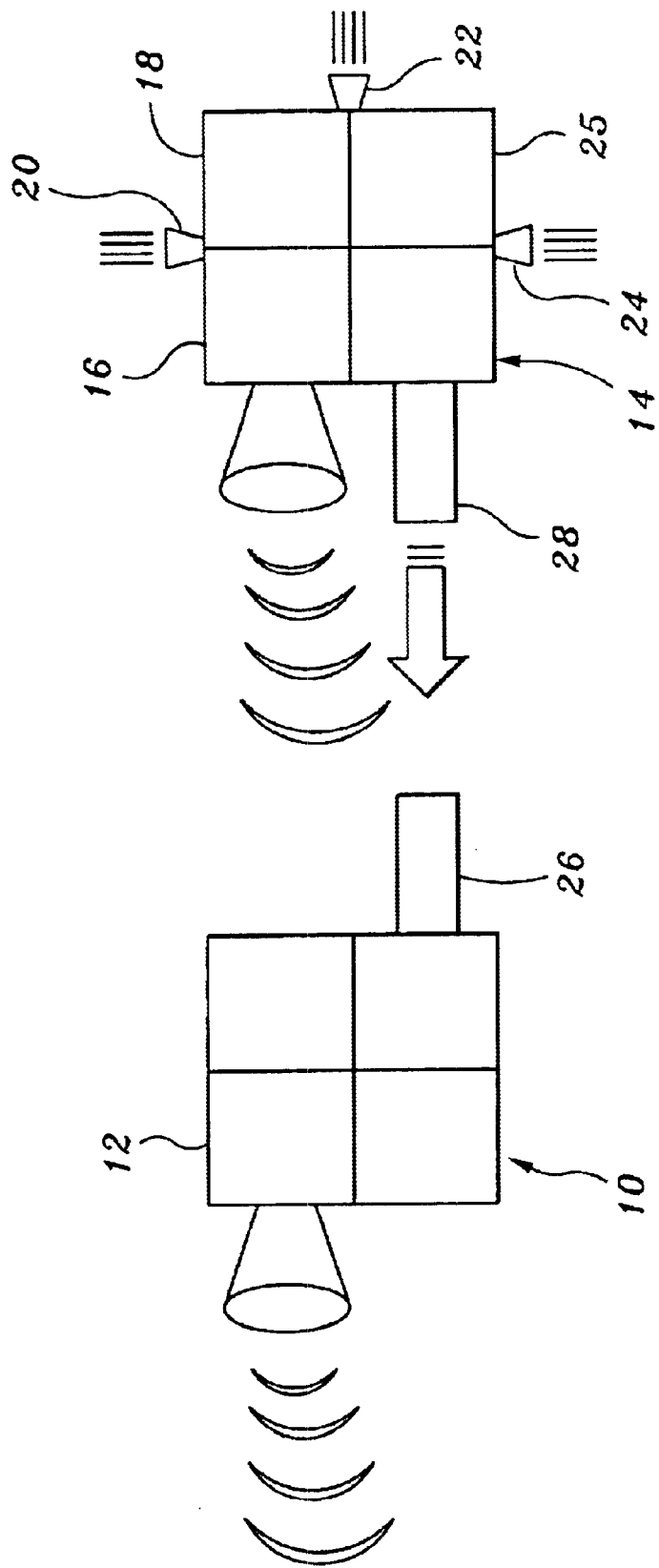
FIG. 1 is a schematic view depicting a conventional proximity operation, in which a target vehicle, such as a satellite, is approached by an active vehicle.
Figure 2:
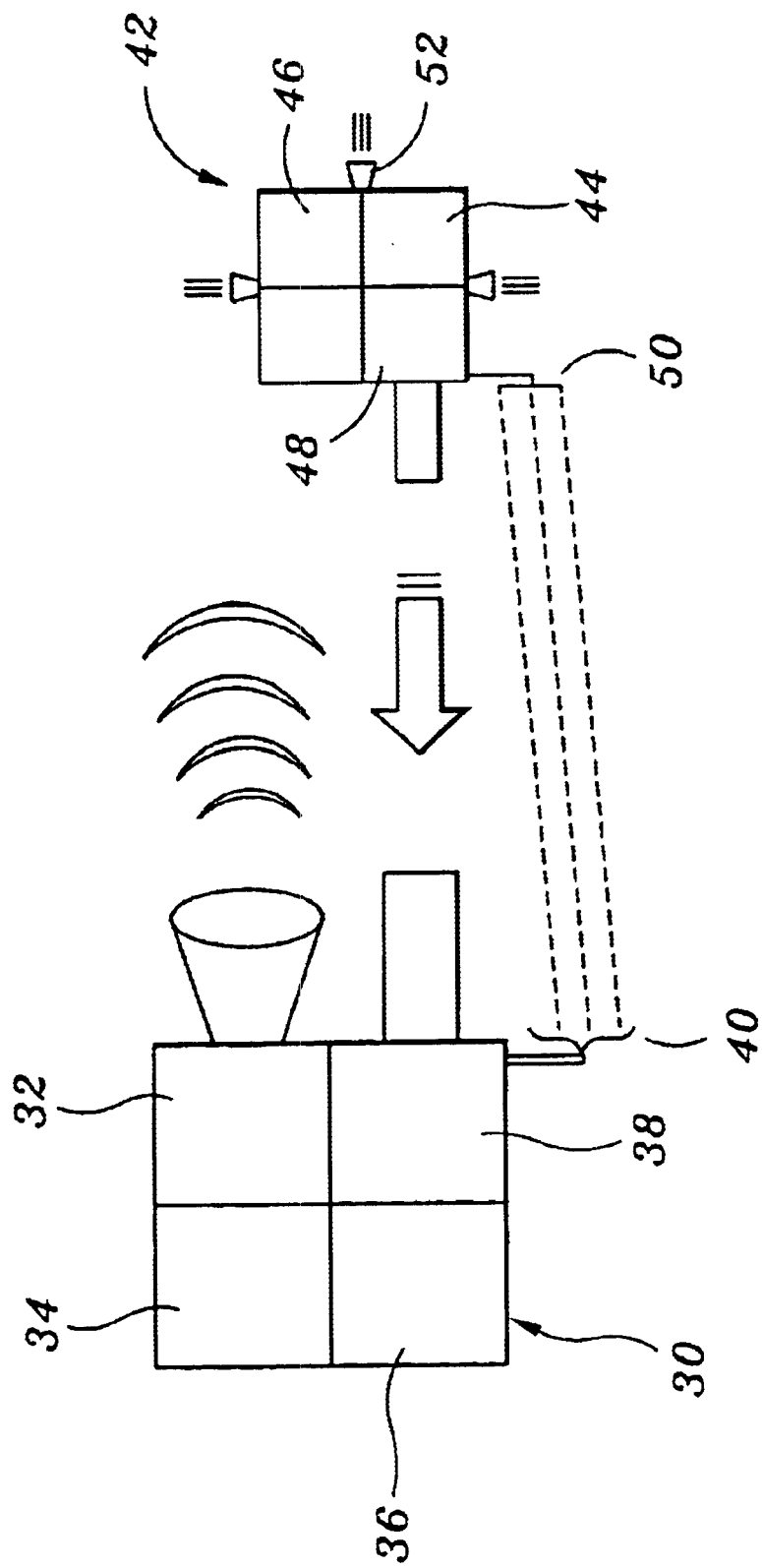
FIG. 2 is a schematic view depicting an inverse proximity operation and systems for performing same according to one embodiment of the present invention.

Referring to FIG. 2, a target satellite 30 includes a payload or sensor 32 which could be, for example, a telescope or other sensing device. The target satellite 30 could have been designed for any number of different missions. For example, the satellite 30 could be an earth observation satellite, a space telescope, or any number of other satellites or space vehicles carrying a variety of instruments. For demonstration of the present inventive concepts, it will be assumed that the satellite 30 includes other standard components including a processor 34 and an attitude control module 36.

One aspect of the invention is to provide a proximity operation in order to effect a repair or service the satellite 30 as the need arises. For example, the satellite 30 may run out of fuel that is necessary to operate on-board thrusters. Without fuel for the thrusters, the orbit of the satellite will eventually decay, causing the satellite to burn up on re-entry into Earth's atmosphere. Other failure possibilities include failures in the attitude control system or components thereof (such as failures of one or more of the momentum wheels), failures in the processor section or components thereof (or simply the need for upgraded processors) or failure to deploy solar arrays or antennae. Any number of other failures may be encountered that could shorten the useful life of the satellite 30 or even cause complete failure of the satellite and/or its mission.

According to the present invention, the satellite 30 includes a communication module 38 that includes a broadcast antenna 40. An active satellite 42 could be launched in response to the discovery of one or more of the aforementioned needs. Alternatively, the active satellite 42 could have been launched at a prior time and placed in a service orbit from which it can be called on an as needed basis. The active satellite 42 is intentionally of smaller dimensions and carries fewer systems, in terms of size and functionality. However, like the satellite 30, active satellite 42 includes an attitude control module 44 and a processor 46. Active satellite 42 is un-manned, and does not carry a mission payload or sensor such as those carried by the target satellite 30. It does, however, include a communication module 48 which includes a receive antenna 50.

As an example of size differences, the target satellite 30 could be in the range of a 3×3×3 meter cube weighing 5,000 kg, while the active satellite 42 could be in the range of a 0.5×0.5×0.5 meter cube weighing 100 kg. Because of these relative size differences, the active satellite is relatively inexpensive to launch compared to the target satellite. For example, the target satellite may require a Space Shuttle mission to launch, while the active satellite 42 could be launched from a single, smaller rocket, such as the Pegasus rocket.

As an initial step in the inverse proximity operation, the active satellite 42 is programmed to initiate a rendezvous operation with the target satellite 30. The rendezvous operation brings the two satellites into general proximity to each other, generally within 1 to 100 kilometers of each other. The rendezvous operation can be effected by launching the active satellite into the target satellite's orbit at a velocity which results in the two satellites coming into proximity. A sensor on the target satellite 30 is directed at the active satellite to obtain data reflecting the position and velocity of the active satellite 42 relative to the target satellite 30, or visa versa. In one embodiment, the payload or sensor 32 of the target satellite 30 is turned in the direction of the active satellite 42, either by turning the target satellite 30 or turning the sensor 32.

Once the sensor 32 begins receiving data indicative of the active satellite's position and velocity, the data is sent to the communication module 38, processed appropriately, and then broadcast to the active satellite 42 via broadcast antenna 40. In accordance with this position and velocity data, the processor 46 computes control signals for rocket motors 52 arranged around the active satellite to effect pitch, roll, yaw, and translational movement of the active satellite 42.

As the active satellite 42 moves into closer proximity to the target satellite 30, the sensor 32 continually provides updated velocity and position data so that the rocket motors 52 can be throttled accordingly. Preferably, the two satellites are brought into an inspection position or a docking position by which a docking mechanism similar to that shown in the prior art example is used. The docking stage of the operation occurs in the last ten (10) centimeters of the maneuver and is typically controlled by known docking software.

Once docking has taken place, the need of the target satellite can be satisfied. For example, if the target satellite 30 is in a declining orbit due to failure of its primary boost motor, the active satellite 42 can use its rocket motors to re-boost the target satellite 30. After re-boosting, the active satellite 42 can de-couple and return to a service orbit, or simply de-boost itself into re-entry into Earth's atmosphere to prevent orbiting debris.

Thus, the active satellite 42 can have a single, primary mission, such as the aforementioned re-boost operation, after which the active satellite 42 can be disposed of. Alternatively, the active satellite 42 can be equipped to perform multiple missions so that, for example, the active satellite 42 can be returned to a service orbit after performing a mission vis-a-vis one target satellite, to be "on call" for other missions for the serviced satellite or other satellite.

Examples of other missions include the following, which is not intended to be an exhaustive list. In the event of a major failure of the target satellite's on-board computer or processor 34, the active satellite 42 may be tasked to provide a replacement processor, either by attaching a removable processor module from the active satellite through the docking mechanism, or by remaining attached after coupling through the docking mechanism with the replacement processor taking over processor functions from the original processor. Similarly, failure of the target satellite's attitude control module could require replacement of the module via attachment of the active satellite 42 to the target satellite 30.

Figure 3:
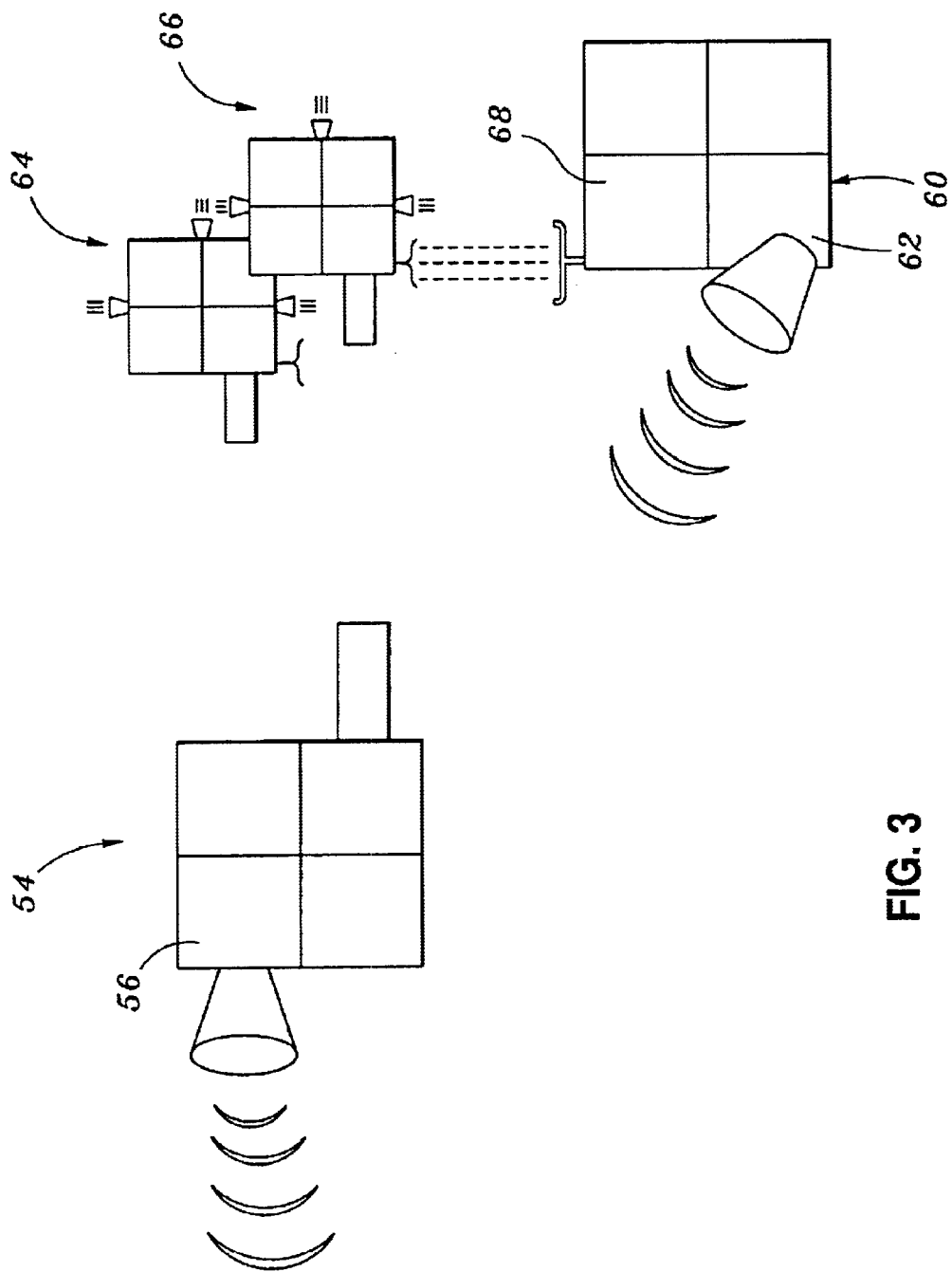
FIG. 3 is a schematic view depicting a distributed proximity operation and systems for performing same according to another embodiment of the present invention.

FIG. 3 describes another embodiment of the present invention in which distributed proximity operations are performed. A target satellite 54 includes a sensor 56, but may or may not include a processor, attitude control module, or communication module. Such a satellite may have been launched some time ago and subsequently developed a problem, such as a failed sensor 56, and may need repair to salvage its mission. Alternatively, the satellite 54 could have been newly launched but because of some system failure, may never have been activated, or -may be unable to achieve a desired orbit.

In the distributed proximity operation embodiment, a satellite 60 may be launched to carry out a repair mission with respect to the target satellite 54 and others. The launch of the satellite 60 may have occurred in response to the failure of the target satellite 54, or it may have been launch prior to that time on an unrelated mission. As an example, the satellite 60 could be the Space Shuttle, or any other vehicle that includes a sensor 62.

Satellite 60 can carry one or more active satellites 64 and 66 which can be decoupled from the satellite 60 for specified missions. Each active satellite includes the same components as the active satellite 42 of the FIG. 2 embodiment, including attitude control system, a processor, a communications module which includes a receive antenna, and a plurality of rocket motors to effect desired maneuvers. Similarly, the satellite 60 includes a communication module 68 which transmits position and velocity data to the one or more active satellites. The active satellites 64 and 66 may be detachably coupled to the satellite 60 prior to deployment for a mission, or may be separately launched and placed in a service orbit, awaiting command signals from a control satellite or vehicle, such as satellite 60. Individual active satellites 64 and 66 may or may not be detachably coupled to each other prior to deployment on a mission.

To initiate the distributed proximity operation, an active satellite, such as satellite 66, is launched to rendezvous with the target satellite 54. The launch may be from the satellite 60, in which case the launch is more of a jettison step, or from a separate launch vehicle, such as a Pegasus rocket. In either event, the satellite 60, acting as a control satellite, also maneuvers to rendezvous with the target satellite 54 but remains at a distance. The distance is one that allows the sensor 62 to "see" both the target satellite 54 and the active satellite 66. Once this happens, the communication antenna of the control satellite broadcasts data indicative of relative position and velocity between the active satellite 66 and the target satellite 54 to the receive antenna of the active satellite 66.

The on-board processor of the active satellite 66 derives control signals for the rocket motors to cause the active satellite 66 to maneuver into an inspection vector or a docking position with respect to the target satellite 54. As in the embodiment of FIG. 2, a docking sequence may be executed which completes the proximity operation, resulting in the coupling of the active satellite 66 to the target satellite 54. Alternatively, the mission of the active satellite 66 may be simply to observe the target satellite 54, e.g., to assess damage visually or with other instrumentation. In such situations, the active satellite would include a broadcast antenna for delivering data to the control satellite, but given the desire to keep the active satellites small, the broadcast of data would be over short distances to limit power requirements and thus size.

In the distributed proximity operation embodiment, any number of missions can be accomplished, include a re-boost, where the active satellite is coupled to the target satellite, and one or more rocket motors of the active satellite are throttled to boost the target satellite into a different, usually higher, orbit. For a re-boost operation, multiple active satellites may be couple at different locations of the target satellite to achieve a desired maneuver.

A variation of the re-boost mission would be a de-boost mission, where, for example, a target satellite is incapable of repair or salvage, and the mission is to send the dead or crippled satellite into the Earth's atmosphere for burn-up, thereby freeing the orbital space from debris.

As mentioned, the mission could be one of simple observation, to collect data without docking, and deliver the data to the mother ship. In the data collection mission, either low power transmission of data is accomplished with a transmit antenna, or the data can be stored on-board the active satellite, and the active satellite can be retrieved by and re-coupled to the control satellite 60.

To describe a typical sequence of steps undertaken for a distributed proximity operation, a target satellite is launched on an independent mission, which may be, for example, a scientific mission to measure gamma radiation The target satellite will include a number of critical sub-systems, such as its on-board processor, power systems, an attitude control system (which in this example includes rocket motors with a finite supply of fuel carried on-board), and the primary mission instrumentation, such as a gamma radiation measuring instrument.

At some time after launch, a system failure is detected, or an anomaly is suspected, and a decision is made to launch a repair mission. A control satellite or vehicle is launched which carries an instrument or sensor capable of sensing telemetry data (typically velocity and position) and a communication module for sending the data to the active satellite. The control satellite, which could be the Space Shuttle, for example, or an unmanned vehicle, undertakes a rendezvous operation, which brings the control satellite in proximity to the target satellite. The rendezvous operation, if carried out by an un-manned vehicle, is typically executed using orbital data of the target satellite and of the control satellite. The timing of launch and other launch and initial guidance parameters may alone bring the control vehicle into a rendezvous with the target satellite.

Once rendezvous is complete, one or more active satellites can be release from the control satellite on an initial trajectory which puts it on a course with the target satellite. This typically would occur when the control satellite is within 1 to 100 kilometers of the target satellite, which is the approximate distance it would take the sensor 62 to begin providing data indicative of the relative position and velocity of the active satellite and the target satellite.

After initial de-coupling of the active satellite from the control satellite, the active satellite is programmed to start moving towards the target satellite. However, once position and velocity information is transmitted to the active satellite from the control satellite, the rocket motor or motors of the active satellite are throttled to bring the active satellite into very close proximity, such as to collect data without docking, or to close the gap between the two until a docking sequence can take over and effect the final docking operation, resulting in a coupling of the active satellite with the target satellite. Depending on the mission, the active satellite may provide boosting, de-boosting, or may augment failed systems by remaining attached but connecting in modular fashion to one or more of the target satellite subsystems.

All of the embodiments described can be analogously applied to the field of aeronautics. For example, an unmanned aircraft such as a drone may be remotely controlled to stay airborne over an area to be observed. When the drone is low on fuel, it must be returned to base for the refueling operation. Using the proximity operations of the present invention, an active aircraft is equipped with a receive antenna, and the drone is equipped with a transmit antenna and a sensor for sensing the position and velocity of the active aircraft. The active aircraft carries a supply of fuel to deliver to the drone. During proximity operation, the sensor gathers data indicative of the relative velocity and position of the drone relative to the active aircraft, and transmits this data through its transmit antenna to the receive antenna of the active aircraft. An on-board processor associated with the active aircraft calculates control signals that will cause the active aircraft to maneuver into a docking position relative to the drone. Once the docking position is achieved, a deployable fuel line connects the fuel tank of the drone to the fuel tank of the active aircraft. Once the re-fueling has been completed, the active aircraft can be programmed to return to base, or to crash land.

Similarly, the active aircraft can be used to perform other functions relative to the drone, such as, observing the drone to detect an otherwise undetectable malfunction, or providing a transfer of field data from the drone to the active aircraft. Such a transfer could be effected without a physical coupling of the two aircraft, in the event of using low-power wireless communication between the drone and the active aircraft. Additional fields of applications include naval and ground vehicle applications.

A further embodiment for satellites is to deploy satellites on initial launch to include detachable pods of the type referred to as the active satellites. In some circumstances, a piece of debris or other obstruction in space may come into a collision course with the target satellite. Once this is detected, the satellite can release one or more pod satellites which are released in the general direction of the obstruction. As soon as the pod and the obstruction can be detected by a sensor located on the satellite, and data can be generated which correlates to the relative velocity and position between the pod and the debris, this data is transmitted to the receive antenna of the pod from the transmit antenna of the target satellite. The pod's processor converts this data into control signals for its propulsion system, in effect guiding the pod into the vicinity of, or into contact with the obstruction. Once in contact, the pod's thrusters can be activated to nudge the obstruction out of its original course.

In general, the inventions described herein can potentially change the design of spacecraft and the way orbital operations are performed by enabling smaller, nimbler spacecraft to perform the required operations. This could potentially decrease by orders of magnitude launch and operation costs, thereby enabling a whole new view of how to use space-based assets.

The new techniques described herein separate the sensing activities of the target and/or host spacecraft (location and orientation of target spacecraft) from the maneuvering activities of the active satellite by taking advantage of communication services and/or relative navigation information between spacecraft. Since the maneuvering satellite does not have to carry the large sensing suite, it can be much lighter and use less fuel. Also, it could dock with a disabled satellite or a satellite that was not originally designed to support a cooperative docking activity.

For inverse proximity operations, where the host spacecraft is required to rendezvous, dock or re-acquire a remote sensing or servicing platform, the host spacecraft's sensing suite is used to determine the relative position of the two spacecraft and to compute the desired commands and trajectories for the active spacecraft to follow. These commands are then transmitted to the active spacecraft which performs the proximity operations with its propulsion system.

For distributed proximity operations, where a third (possibly disabled) spacecraft is the target, the host spacecraft sensing suite is used to determine the relative position of the maneuvering spacecraft and the target spacecraft, and to compute a trajectory and propulsion commands. This information is communicated to the active spacecraft which executes the desired proximity operations.

In both cases the feedback for the proximity operations is sensed and preferably computed on a spacecraft separate from the spacecraft that maneuvers.

Although the invention has been described with reference to particular embodiments, it will be understood to those skilled in the art that the invention is capable of a variety of alternative embodiments within the sprit of the appended claims.

What is claimed is:

1. A method of docking with a target vehicle comprising the steps of:

maneuvering an active vehicle into general proximity to a the target vehicle;

transmitting from the target vehicle to the active vehicle data representing relative position and velocity between the target vehicle and the active vehicle; and maneuvering the active vehicle in accordance with the data to dock with the target vehicle.

2. A method according to claim 1, wherein the step of maneuvering the active vehicle includes processing the data into command signals, and operating at least one control device on the active vehicle until the docking is substantially complete.

3. A method according to claim 2, wherein the target vehicle is a first satellite and the active vehicle is a second satellite, the at least one control device includes at least one thruster disposed on the second satellite, and the step of maneuvering the active vehicle includes throttling the at least one thruster in accordance with the command signals.

4. A method according to claim 2, wherein the target vehicle is a first aircraft and the active vehicle is a second aircraft, the at least one control device includes at least one control surface, and the step of maneuvering the active vehicle includes moving the at least one control surface in accordance with the command signals.

5. An active vehicle for docking with a target vehicle, comprising:
   first means for maneuvering the active vehicle into general proximity to the target vehicle;
   sensor means, connected to the target vehicle, for transmitting from the target vehicle to the active vehicle data representing relative position and velocity between the target vehicle and the active vehicle; and
   second means for maneuvering the active vehicle in accordance with the data to dock with the target vehicle.

6. An active vehicle according to claim 5, wherein the first maneuvering means includes means for propelling the active vehicle into general proximity to the target vehicle.

7. An active vehicle according to claim 6, wherein the general proximity is substantially a distance within which the sensor means is capable of providing relative position and velocity data.

8. An active vehicle according to claim 7, wherein the distance is approximately one to one hundred kilometers.

9. An active vehicle according to claim 5, wherein the sensor means is a payload instrument of the target vehicle.

10. An active vehicle according to claim 5, wherein the second maneuvering means includes a transmit antenna coupled to the target vehicle, and a receive antenna coupled to the active vehicle, wherein the position and velocity data is transmitted from the target vehicle to the active vehicle.

11. An active vehicle according to claim 5, wherein the active vehicle and the target vehicle are deployable in space.

12. An active vehicle according to claim 11, wherein the active vehicle and the target vehicle are satellites.

13. An active vehicle according to claim 5, wherein the active vehicle and the target vehicle are unmanned aircraft.

14. An active vehicle according to claim 5, wherein the active vehicle carries at least one of a replacement subsystem and fuel.

15. An active vehicle according to claim 14, wherein the replacement subsystem is selected from the group consisting of an instrument, an instrumentation package, an electrical power system or component thereof, an attitude control system or component thereof, a processor or component thereof, and a propulsion system or component thereof.

16. A system for re-fueling an unmanned aircraft, comprising:
   a service aircraft having a receive antenna and a transferable supply of fuel;
   a sensor disposed on the unmanned aircraft for generating data indicative of relative position between the service aircraft and the unmanned aircraft;
   a transmit antenna disposed on the unmanned aircraft for transmitting the data from the unmanned aircraft to the service aircraft; and
   a propulsion and control system associated with the service aircraft, for maneuvering the service aircraft into a docking position with respect to the unmanned aircraft in response to the data.

17. A method of docking with a target vehicle comprising the steps of:
   maneuvering a control vehicle into general proximity to the target vehicle;
   deploying at least one active vehicle from the control vehicle;
   transmitting from the control vehicle to the active vehicle data representing relative position and velocity between the target vehicle and the active vehicle; and
   maneuvering the active vehicle in accordance with the data to dock with the target vehicle.

18. A method according to claim 17, wherein the step of maneuvering the active vehicle includes processing the data into command signals, and operating at least one control device on the target vehicle until the docking is substantially complete.

19. A method according to claim 18, wherein the target vehicle is a first satellite and the active vehicle is a second satellite, the at least one control device includes at least one thruster disposed on the second satellite, and the step of maneuvering the active vehicle includes throttling the at least one thruster in accordance with the command signals.

20. A method according to claim 18, wherein the target vehicle is a first aircraft and the active vehicle is a second aircraft, the at least one control device includes at least one control surface, and the step of maneuvering the active vehicle includes moving the at least one control surface in accordance with the command signals.

21. A system for docking with a target vehicle comprising:
   a control vehicle adapted to be maneuvered into general proximity to a the target vehicle;
   at least one active vehicle deployable into general proximity to the target vehicle;
   a sensor, located on the control vehicle, for transmitting from the control vehicle to the active vehicle data representing relative position and velocity between the target vehicle and the active vehicle; and
   means for maneuvering the active vehicle in accordance with the data to dock with the target vehicle.

22. A system according to claim 21, further comprising a transmit antenna connected to the control vehicle, and a receive antenna connected to the active vehicle, wherein the data is transmitted from the control vehicle to the active vehicle.

23. A system according to claim 22, wherein the maneuvering means includes a propulsion system for moving the active vehicle in accordance with the data to bring the active vehicle towards a docking position with respect to the target vehicle.

24. A system according to claim 23, wherein the target vehicle is a satellite, the control vehicle is a space vehicle, and the at least one active vehicle is a pod detachably coupled to the space vehicle.

25. A system according to claim 23, wherein the at least one pod carries at least one of a replacement system or a component of a system.

26. A system according to claim 25, wherein the replacement system and component of a system are selected from the group consisting of a processor or component thereof, an attitude control system or component thereof, a propulsion system or component thereof, an electrical power system or component thereof.

* * * * *